(12) United States Patent
Korol et al.

(10) Patent No.: US 12,401,309 B2
(45) Date of Patent: Aug. 26, 2025

(54) THREE-PHASE MOTOR CURRENT MEASUREMENT

(71) Applicant: Allegro MicroSystems, LLC, Manchester, NH (US)

(72) Inventors: Serhii Korol, Kyiv (UA); Anton Babushkin, Kyiv (UA); Dmytro Sakharov, Kyiv (UA); Oleksii Dudnyk, Poltava (UA)

(73) Assignee: Allegro MicroSystems, LLC, Manchester, NH (US)

( * ) Notice: Subject to any disclaimer, the term of this patent is extended or adjusted under 35 U.S.C. 154(b) by 166 days.

(21) Appl. No.: 18/173,236

(22) Filed: Feb. 23, 2023

(65) Prior Publication Data

US 2024/0291415 A1  Aug. 29, 2024

(51) Int. Cl.
*H02P 27/08*  (2006.01)
*H02P 21/00*  (2016.01)
*H02P 21/22*  (2016.01)
*H02P 21/34*  (2016.01)

(52) U.S. Cl.
CPC .............. *H02P 27/08* (2013.01); *H02P 21/22* (2016.02); *H02P 21/34* (2016.02); *H02P 21/50* (2016.02)

(58) Field of Classification Search
CPC .......... H02P 27/08; H02P 21/22; H02P 21/34; H02P 21/50; H02M 7/53876; H02M 7/5395; H02M 1/0009
See application file for complete search history.

(56) References Cited

U.S. PATENT DOCUMENTS

| | | | |
|---|---|---|---|
| 5,256,949 A | 10/1993 | Reichard et al. | |
| 5,309,349 A * | 5/1994 | Kwan | G01R 19/0092 363/78 |
| 5,708,578 A | 1/1998 | Stoddard et al. | |
| 5,955,862 A | 9/1999 | Nguyen Phuoc | |

(Continued)

FOREIGN PATENT DOCUMENTS

| | | |
|---|---|---|
| CN | 108712124 A | 10/2018 |
| CN | 112436749 A | 3/2021 |

(Continued)

OTHER PUBLICATIONS

Response (with English Translation) to Taiwan Office Action dated Aug. 30, 2024 for Taiwan Application No. 112142465; Response Filed Nov. 21, 2024; 64 Pages.

(Continued)

*Primary Examiner* — Rina I Duda
(74) *Attorney, Agent, or Firm* — DALY, CROWLEY, MOFFORD & DURKEE, LLP

(57) ABSTRACT

Methods and apparatus for controlling a three-phase electric motor by determining a duration of current measurement windows within a first pulse width modulation period for measuring motor current using a single shunt coupled to the motor. A duration of a first one of the current measurement windows can be adjusted by a time delta value to meet a minimum time to measure the motor current. A next PWM period can include compensation for the time delta value. In embodiments window adjustments are made by modifying the high state of a middle phase signal for phase signals to switches that energize the motor.

22 Claims, 16 Drawing Sheets

(56) References Cited

U.S. PATENT DOCUMENTS

| | | | | |
|---|---|---|---|---|
| 6,049,474 | A * | 4/2000 | Platnic | H02M 7/53873 |
| | | | | 363/132 |
| 7,042,191 | B2 * | 5/2006 | Hirono | H02M 7/53873 |
| | | | | 318/762 |
| 7,414,425 | B2 * | 8/2008 | O'Gorman | H02P 23/04 |
| | | | | 318/696 |
| 7,590,334 | B2 | 9/2009 | Yabusaki et al. | |
| 7,747,146 | B2 | 6/2010 | Milano et al. | |
| 7,831,402 | B2 * | 11/2010 | D'Angelo | H02P 27/06 |
| | | | | 702/89 |
| 7,952,310 | B2 | 5/2011 | Hamasaki | |
| 8,228,012 | B2 * | 7/2012 | Hamasaki | H02P 29/50 |
| | | | | 361/131 |
| 8,729,841 | B2 | 5/2014 | Reynolds et al. | |
| 8,917,043 | B2 | 12/2014 | Reynolds et al. | |
| 8,917,044 | B2 | 12/2014 | Reynolds et al. | |
| 9,088,233 | B2 | 7/2015 | Alcorn et al. | |
| 9,130,482 | B2 * | 9/2015 | Zhao | H02M 7/53875 |
| 9,291,876 | B2 | 3/2016 | Cadugan et al. | |
| 9,331,612 | B2 | 5/2016 | Kuratani | |
| 9,337,755 | B2 * | 5/2016 | Hamasaki | H02P 6/28 |
| 9,843,285 | B1 | 12/2017 | Lu | |
| 10,116,243 | B2 | 10/2018 | Lu et al. | |
| 10,181,810 | B2 | 1/2019 | Lu et al. | |
| 10,236,808 | B2 | 3/2019 | Murray et al. | |
| 10,312,847 | B2 | 6/2019 | Lu | |
| 10,326,389 | B2 | 6/2019 | Lu et al. | |
| 10,348,223 | B1 | 7/2019 | Khosravi et al. | |
| 10,511,244 | B2 | 12/2019 | Ishino | |
| 10,784,810 | B1 | 9/2020 | Lu | |
| 10,804,822 | B2 | 10/2020 | Alcorn et al. | |
| 10,819,257 | B1 | 10/2020 | Khosravi et al. | |
| 10,873,280 | B2 | 12/2020 | Lu et al. | |
| 10,924,052 | B1 | 2/2021 | Khosravi et al. | |
| 11,658,597 | B1 | 5/2023 | Babushkin et al. | |
| 2009/0167223 | A1 | 7/2009 | Goto et al. | |
| 2012/0163046 | A1 | 6/2012 | Hibino | |
| 2013/0158808 | A1 | 6/2013 | Imamura et al. | |
| 2013/0264974 | A1 | 10/2013 | Suzuki | |
| 2014/0055064 | A1 | 2/2014 | Ng | |
| 2016/0065087 | A1 | 3/2016 | Nagaoka | |
| 2018/0294752 | A1 * | 10/2018 | Motoyama | H02P 23/14 |
| 2020/0021212 | A1 | 1/2020 | Yamada et al. | |
| 2020/0028456 | A1 | 1/2020 | Morioka et al. | |
| 2020/0235682 | A1 | 7/2020 | Khosravi et al. | |
| 2020/0295682 | A1 | 9/2020 | Lu | |
| 2020/0313637 | A1 | 10/2020 | Daubert et al. | |

FOREIGN PATENT DOCUMENTS

| | | |
|---|---|---|
| CN | 112953340 A | 6/2021 |
| CN | 114598200 A | 6/2022 |
| DE | 10 2006 052467 A1 | 5/2008 |
| EP | 1 347 567 A1 | 9/2003 |
| JP | 2006-230049 A | 8/2006 |
| JP | 2013-068639 A | 4/2013 |
| JP | 2014-024460 A | 2/2014 |

OTHER PUBLICATIONS

Lim, "Sensorless-FOC for PMSM with Single DC-Link Shunt;" Application Note (SPRACT7) from Texas Instruments; Aug. 2020; 32 Pages.

Torres et al., "Single-Shunt Three-Phase Current Reconstruction Algorithm for Sensorless FOC of a PMSM;" Data Sheet AN1299 from Microchip Technology Inc.; Mar. 26, 2009; 24 Pages.

Datasheet, Microchip Technology Inc.; AN1299 "Single-Shunt Three-Phase Current Reconstruction Algorithm for Sensorless FOC of a PMSM" 2009; 24 Pages.

PCT International Search Report and Written Opinion dated Jul. 20, 2020 for International Appln. No. PCT/US2020/025657; 13 Pages.

U.S. Notice of Allowance dated Aug. 24, 2020 for U.S. Appl. No. 16/561,334; 18 Pages.

U.S. Notice of Allowance dated Mar. 29, 2023 for U.S. Appl. No. 17/645,118; 11 Pages.

U.S. Non-Final Office Action dated May 19, 2020 for U.S. Appl. No. 16/396,877; 8 Pages.

Response to U.S. Non-Final Office Action dated May 19, 2020 for U.S. Appl. No. 16/396,877; Response filed Jun. 8, 2020; 7 Pages.

U.S. Notice of Allowance dated Jul. 29, 2020 for U.S. Appl. No. 16/396,877; 8 Pages.

PCT International Preliminary Report on Patentability dated Nov. 11, 2021 for International Appln. No. PCT/US2020/025657; 8 Pages.

European Pursuant to Rules 161 and 162 dated Sep. 8, 2021 for European Application No. 20721953.6; 3 Pages.

Response to European Pursuant to Rules 161 and 162 dated Sep. 8, 2021 for European Application No. 20721953.6; Response filed Mar. 18, 2022; 18 Pages.

Japanese Office Action (with Machine English Translation) dated Apr. 4, 2023 for Japanese Application No. 2021-562120; 9 Pages.

Taiwan Office Action (with English Translation) dated Aug. 30, 2024 for Taiwan Application No. 112142465; 23 Pages.

European Extended Search Report dated May 2, 2024 for European Application No. 23207804.8; 6 Pages.

Taiwan Examination Report (with English Translation) dated Jan. 2, 2025 for Taiwan Application No. 112142465; 6 Pages.

Response (with Machine English Translation) to Taiwan Examination Report dated Jan. 2, 2025 for Taiwan Application No. 112142465; Response Filed Mar. 3, 2025; 19 Pages.

Taiwan Office Action (with English Translation) dated May 20, 2025 for Taiwan Application No. 112142465; 6 Pages.

* cited by examiner

THREE-PHASE MOTOR CURRENT MEASUREMENT

BACKGROUND

As is known in the art, motor controller integrated circuits can be used to control and drive brushless DC (BLDC) electric motors. Conventional control systems for permanent magnet synchronous machines (PMSM) typically supply a sinusoidal voltage to the motor that changes only in frequency, phase and amplitude. Current to the motor can be measured directly or indirectly to ensure proper operation of the motor. Current measurements require a certain amount of time to obtain accurate values. Extending current measurement windows may distort signals to the motor.

Field-oriented control (FOC) is a known variable frequency drive technique in which stator currents of a three-phase brushless DC motor are represented as a vector having two orthogonal components corresponding to magnetic flux of the motor and motor torque. Current component references from the flux and torque references given by the speed control can be computed. Proportional-integral (PI) controllers are often used to maintain current components at reference values. PWM (pulse width modulation) of the variable frequency drive control switching of transistors driving the motor phases according to the stator voltage references that are the output of the PI current controllers.

Vector control generates a three-phase PWM motor voltage output derived from a voltage vector to control a current vector derived from motor three-phase stator current input through rotations back and forth between the three-phase speed and time dependent system and the vector rotating reference-frame two-coordinate time invariant system, which is defined in a (d,q) coordinate system with orthogonal components along d (direct) and q (quadrature) axes such that a field flux linkage component of current is aligned along the d axis and torque component of current is aligned along the q axis. The induction motor (d, q) coordinate system can be superimposed to the instantaneous (a,b,c) three-phase sinusoidal system.

Well-known inverse and non-inverse Park and Clarke transforms can convert between a system three phase currents and voltages and a two coordinate linear time-invariant system. These transforms facilitate the use of PID controllers to maintain reference values.

SUMMARY

Example embodiments of the disclosure provide methods and apparatus for single-shunt current measurement in a three-phase motor. In embodiments, single-shunt current measurement is performed when it may not be possible to form a current measurement window without distortion of the phase voltage.

In one aspect, a method comprises: controlling a three-phase electric motor by: determining a duration of current measurement windows within a first pulse width modulation period for measuring motor current using a single shunt coupled to the motor; adjusting a duration of a first one of the current measurement windows by a time delta value to meet a minimum time to measure the motor current.

A method can further include one or more of the following features: the motor current is measured for only two of the three motor phases during the first pulse width modulation period, the motor current measurement is not performed in the compensation periods, adjusting a second one of the pulse width modulation periods by the time delta value to compensate for adjusting the duration of the first one of the current measurement windows in the first one of the pulse width modulation periods, wherein the second one of the pulse width modulation periods occurs after the first one of the pulse width modulation periods, controlling a three-phase electric motor includes controlling driver switches for driving the motor phase including controlling a high side (HS) switch ON state duration having a zone of maximum phase Z, a zone of middle phase Y, and a zone of minimum phase X, the zone of maximum phase Z is above a maximum time t_max, and the zone of minimum phase X is below a minimum time t_min, and the zone of middle phase Y is between the minimum time t_min and the maximum time t_max, changing minimum and maximum duration times of the ON state of the upper transistor in the middle phase Y when a duration of a given PWM period changes, modifying a duration of the middle phase Y from a reference Y signal to adjust the duration of the first one of the current measurement windows by the time delta value to meet the minimum time to measure the motor current, modifying a duration of the middle phase Y from a reference Y signal by the time delta value in a second one of the pulse width modulation periods to compensate for adjusting the duration of the first one of the current measurement windows in the first one of the pulse width modulation periods, wherein the second one of the pulse width modulation periods occurs after the first one of the pulse width modulation periods, and/or the middle phase Y does not transition during the second one of the pulse width modulation periods.

In another aspect, a system comprises: a motor controller having circuitry configured to control a three-phase electric motor by: determining a duration of current measurement windows within a first pulse width modulation period for measuring motor current using a single shunt coupled to the motor; adjusting a duration of a first one of the current measurement windows by a time delta value to meet a minimum time to measure the motor current.

A system can further include one or more of the following features: the motor current is measured for only two of the three motor phases during the first pulse width modulation period, the motor current measurement is not performed in the compensation periods, adjusting a second one of the pulse width modulation periods by the time delta value to compensate for adjusting the duration of the first one of the current measurement windows in the first one of the pulse width modulation periods, wherein the second one of the pulse width modulation periods occurs after the first one of the pulse width modulation periods, controlling a three-phase electric motor includes controlling driver switches for driving the motor phase including controlling a high side (HS) switch ON state duration having a zone of maximum phase Z, a zone of middle phase Y, and a zone of minimum phase X, the zone of maximum phase Z is above a maximum time t_max, and the zone of minimum phase X is below a minimum time t_min, and the zone of middle phase Y is between the minimum time t_min and the maximum time t_max, changing minimum and maximum duration times of the ON state of the upper transistor in the middle phase Y when a duration of a given PWM period changes, modifying a duration of the middle phase Y from a reference Y signal to adjust the duration of the first one of the current measurement windows by the time delta value to meet the minimum time to measure the motor current, modifying a duration of the middle phase Y from a reference Y signal by the time delta value in a second one of the pulse width modulation periods to compensate for adjusting the duration of the first one of the current measurement windows in the first one of the pulse width modulation periods, wherein the second one of the pulse width modulation periods occurs after the first one of the pulse width modulation periods, and/or the middle phase Y does not transition during the second one of the pulse width modulation periods.

BRIEF DESCRIPTION OF THE DRAWINGS

The foregoing features of this invention, as well as the invention itself, may be more fully understood from the following description of the drawings in which.

DETAILED DESCRIPTION

Figure 1:
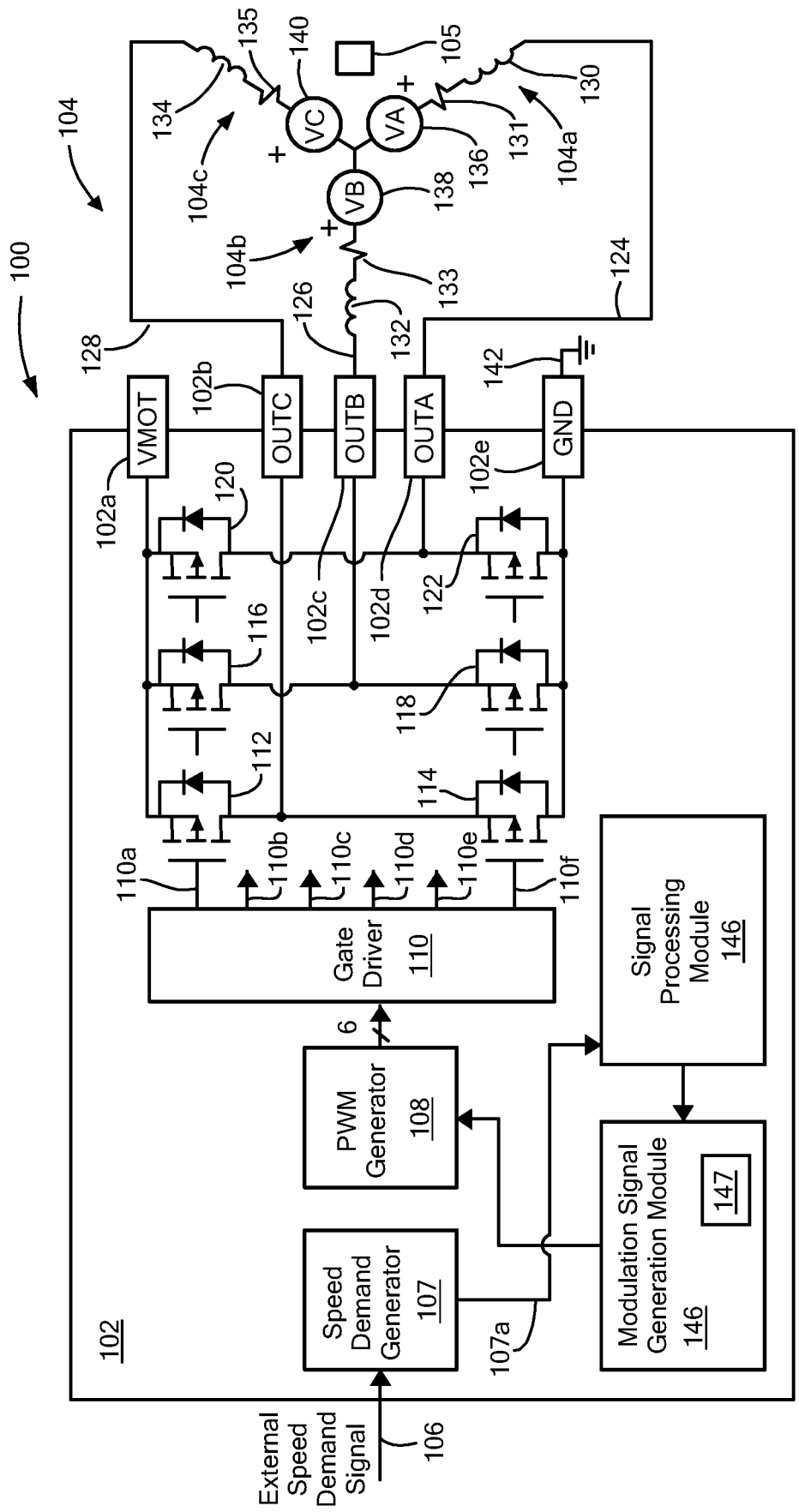
FIG. 1 shows an example electric motor control circuit having current measurement compensation in accordance with example embodiments of the disclosure.

FIG. 1 shows an example motor control circuit 102 coupled to an electric motor 104 for providing current measurement compensation in accordance with example embodiments of the disclosure. In embodiments, the system 102 comprises a sensorless Field Oriented Control (FOC) system. In some embodiments, an optional magnetic sensing element 105, which can comprise a Hall element, can collect current information to enhance operational efficiency and performance of the overall system.

It should be noted that the term sensorless control, without specifying the type of absence sensor, implies the absence of a speed sensor. Example compensator embodiments can be used in systems with and without a speed sensor, or in other words: speed control systems and sensorless speed control systems.

The motor 104 is shown to include three windings 104a, 104b, 104c, which can be depicted as a respective equivalent circuit having an inductor in series with a resistor and in series with a back EMF (BEMF) voltage source. For example, the winding A 104a is shown to include an inductor 130 in series with a resistor 131 and in series with a back EMF voltage source VA 136.

The motor control circuit 102 includes a speed demand generator 107 coupled to receive an external speed demand signal 106 from outside of the motor control circuit 102. The external speed demand signal 106 can be in one of a variety of formats. In general, the external speed demand signal 106 is indicative of a speed of the motor 104 that is requested from outside of the motor control circuit 102.

The speed demand generator 107 is configured to generate a speed demand signal 107a, which can be sent to a signal processing module 143. A pulse width modulation (PWM) generator 108 is configured to generate PWM signals having a duty cycle and pattern that is controlled by a modulation signal generation module 146. The PWM signals are generated with a modulation characteristic (i.e., a relative time-varying duty cycle) in accordance with the modulation waveforms. In example embodiments, information is transmitted from the 107, to a signal processing module 143, to a modulation signal generation module 146, to the PWM generator 108. The modulation signal generation module 146 can include a compensation module 147 the operation of which is described more fully below.

The motor control circuit 102 also includes a gate driver circuit 110 coupled to receive the PWM signals and configured to generate PWM gate drive signals 110a, 110b, 110c, 110d, 110e, 110f to drive six transistors 112, 114, 116, 118, 120, 122 arranged as three half-bridge circuits 112/114, 116/118, 120/122. The six transistors 112, 114, 116, 118, 120, 122 operate in saturation to provide three motor drive signals VoutA, VoutB, VoutC, Outs, 124, 126, 128, respectively, at nodes 102d, 102c, 102b, respectively. It is understood that any suitable configuration of switching elements can be used to provide the motor drive signals.

The signal processing module 143 is configured to generate a position reference signal indicative of a rotational reference position of the motor 104. The modulation signal generation module 146 is coupled to receive the position reference signal and configured to change a phase of the modulation waveforms provided to the PWM generator 108.

The motor control circuit 102 can be coupled to receive a motor voltage VMOT, or simply VM, at a node 102a, which is supplied to the motor through the transistors 112, 116, 120 during times when the upper transistors 112, 116, 120 are turned on. It will be understood that there can be a small voltage drop (for example, 0.1 volts) through the transistors 112, 116, 120 when they are turned on and supplying current to the motor 104.

Figure 2:
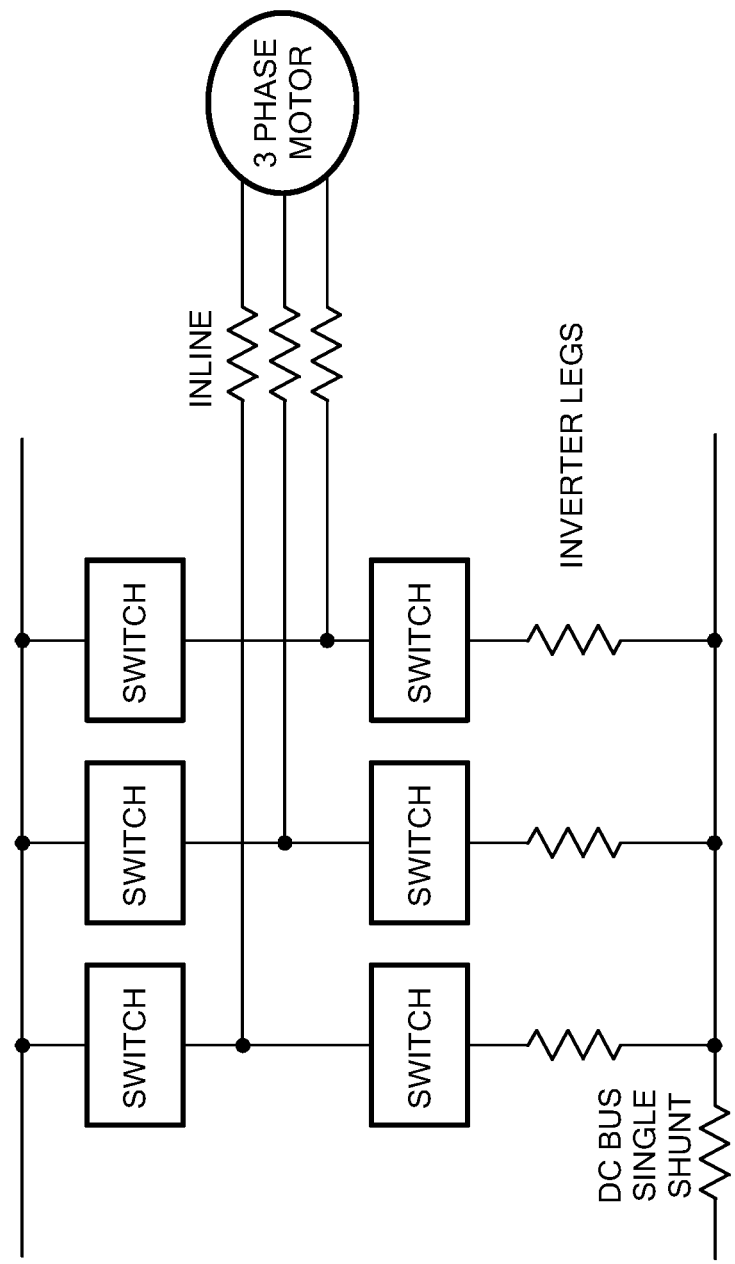
FIG. 2 shows various current measurement techniques for measuring motor currents.

Prior to describing example embodiments of the disclosure in detail, some information is provided. Brushless Permanent Magnet Synchronous Motor (PMSM) are useful in industrial and automotive applications. Motor controllers often use Field Oriented Control (FOC) and Pulse Width Modulation (PWM) for variable-speed ac motor drivers. As shown in FIG. 2, in some applications, inline current sensing can be provided by three shunt resistors located in the respective low sides of power switches that drive the motor phases to measure three-phase motor currents for FOC. In other configurations, a single-shunt resistor is located in the dc link return side. In other configurations, resistors can be located in the inverter legs for current sensing.

In example FOC implementations the torque in the synchronous machine is a vector cross product of the stator field or current vector and rotor magnetic field vector. It is desirable that the stator current vector and rotor magnetic field vector are orthogonal to achieve maximum torque for a given stator current. To maintain the vectors at an angle of 90 degrees, the rotor position must be known, such by using a position sensor or estimating in sensorless systems. FOC controls the stator current vector based on the rotor flux vector. FOC processing aligns the stator current vector to a ninety degree angle with respect to the rotor flux vector. To align the stator current, the three-phase stator current is measured, such as by shunts or current sensors, three sensors can measure phase current or inverter leg current, and/or a single sensor can measure current and use phase current reconstruction, as shown in FIG. 2. With a single-shunt measurement scheme, the current can be measured in active states (at least in one of the phases the upper switch and least in one of the phases the lower switch are switched on). If all three lower switches are on, no current flows through the shunt.

Figure 3:
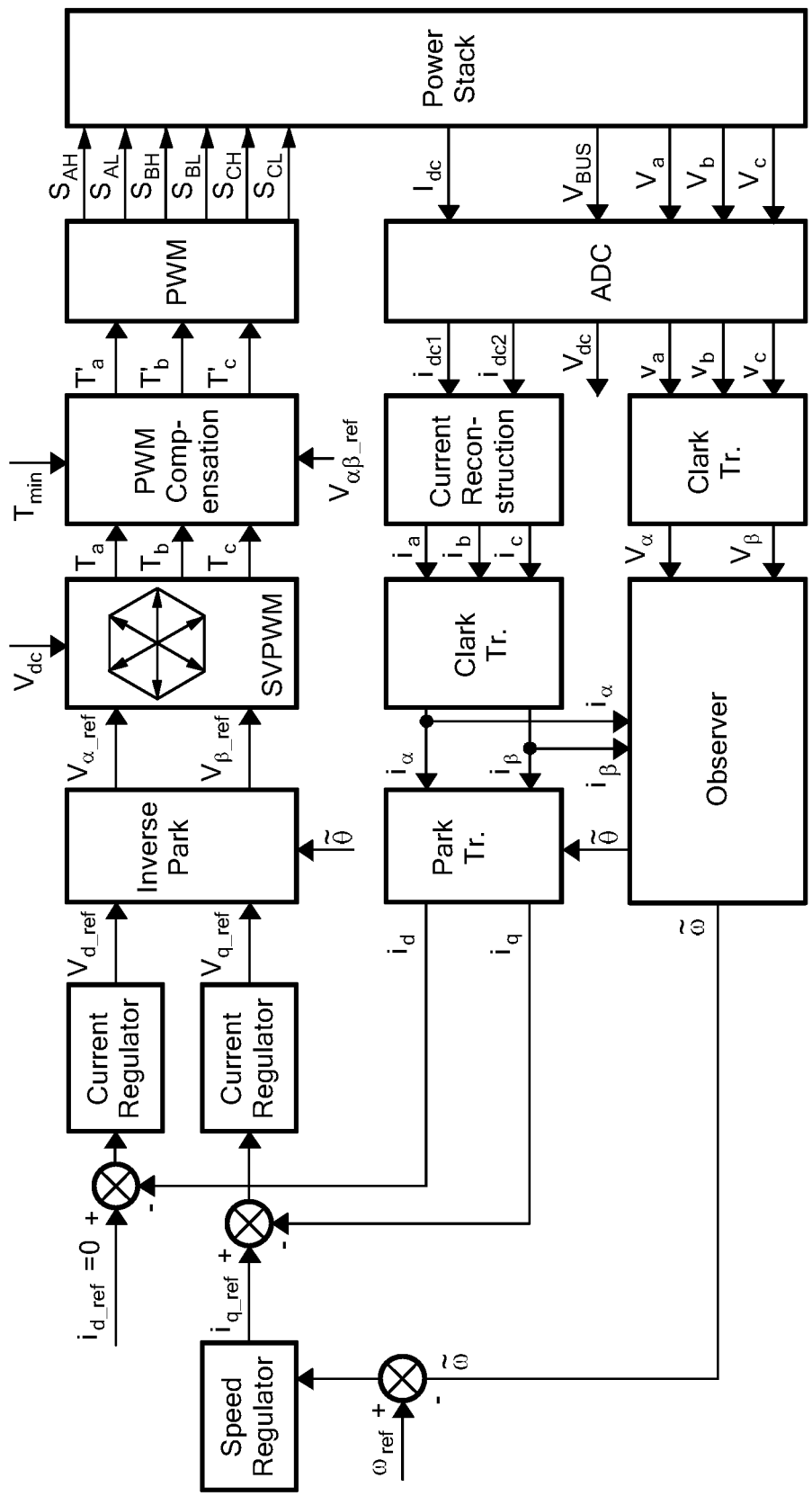
FIG. 3 shows an example FOC based motor control implementation.

FIG. 3 shows an FOC implementation described in SPRACT17 2020, Texas Instruments, which is incorporated by reference, in which current measurements feed into the Clarke transformation module. The outputs of this projection designated iα and iβ are the inputs of the Park transformation that gives the current in the d,q rotating reference frame. The id and iq components are compared to the references id_ref (the flux reference) and iq_ref (the torque reference). For controlling a non-saliency PMSM, id_ref will be set to zero except flux-weakening control mode. The torque command iq_ref may be the output of the speed regulator when using a speed controller. The outputs of the current regulators are Vd_ref and Vq_ref; they are applied to the inverse Park transformation. The outputs of this projection are Vα_ref and Vβ_ref, which are the components of the stator vector voltage in the (α,β) stationary orthogonal reference frame. These are the inputs of the Space Vector PWM (SVM). The outputs of this SVM block are the signals that drive the inverter. For single-shunt measurement, the switching pattern of SVPWM is modified to reconstruct the phase current in the unmeasurable area. Note that both Park and inverse Park transformations need the rotor flux position. So, knowledge of the rotor flux position is the core of the FOC.

Figure 4:
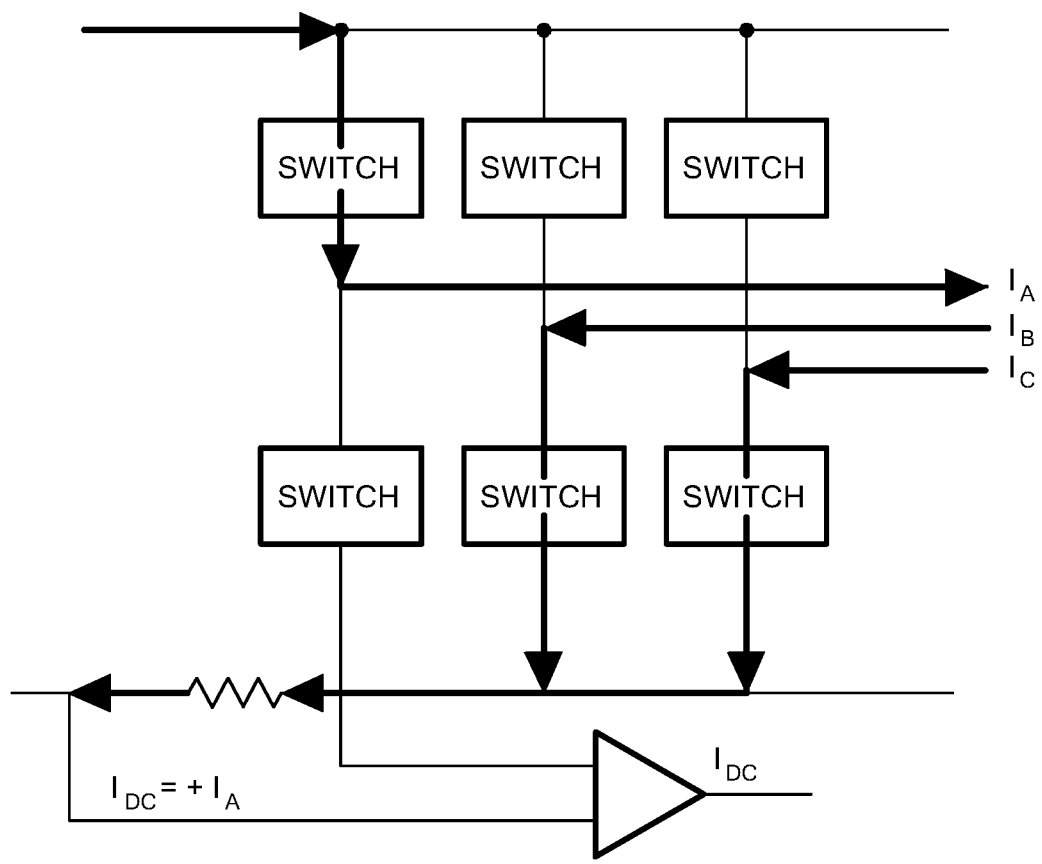
FIG. 4 shows current flow through switches for driving phases of the motor.

The single-shunt current measurement processing measures the dc link current and recreates each of the three phase currents of the motor based on the switching states. FIG. 4 shows an amplifier to measure the current across a sense resistor and output $I_{DC}$. Assuming a switching function Sa for phase A as follows: Sa=1 when the upper transistor of phase A is ON, and Sa=0 when the lower transistor of phase A is ON. Similar definitions can be made for phases B and C. The explanation of the process is based on the assumption that the inverter is fed in complementary mode. The signals in this mode, which control the lower transistors, are the opposite of Sa, Sb, Sc, which controls the upper transistors. As previously stated, the measurement method in single-shunt current sensing depends on the switching states of the inverter switches. In the illustrated system, the top-side switch of phase A is conducting and bottom-side switches of phase B and C are conducting. In this switching state, the DC bus current measurement gives the phase A current and is positive (+IA). The direction of current in phase A is towards the motor winding. In other states, the top-side switches of phase A and phase B are conducting and the bottom-side switch of phase C is conducting. In this switching state, the DC bus current measurement gives the phase-C current and is negative (−IC). The direction of current in phase C is towards the inverter from the motor winding.

In general, there are eight switch positions for SVM PWM each having corresponding directions for the voltage space vector and the current to be measured for that state. SVM (Space vector modulation) refers to processing for the control of PWM (pulse width modulation). In two states, circulating current is present so that current in a single-shunt configuration cannot be measured. The remaining states current can be measured.

In one aspect of the disclosure, a deviation of the generated phase voltage caused by windows for current measurements is compensated for in PWM periods without current measurements. The number of PWM compensation periods between PWM measurement periods may be determined by the amount of compensation required of the recalculation of the control system processing.

Each of the six active combination of switches where current flows through the shunt in the DC-link ensures the flow of one of the phase currents of the motor through the shunt. In embodiments, only two phase currents need to be measured in a PWM period, and the third is determined by the Kirchhoff's current law. Thus, in each PWM period there should be two active states, which can be referred to as measurement windows with a duration that is not less than Tcat. This condition imposes restrictions on the minimum and maximum duration of the on state of the upper transistor in the phase with the average value of the reference voltage (in middle phase Y), as described more fully below.

The reference voltage refers to the numerical value of the phase voltage calculated by the controller, which is applied to the motor in order to achieve the control objectives. The applied voltage is the average voltage for PWM periods formed on the motor windings as a result of switching the converter switches. These voltages are equal in most cases, except for the situation when, in order to measure currents, it is necessary to modify the HS in the middle phase Y, as described more fully below.

The phase voltage applied by the converter to the motor windings is equivalent to the reference voltage, if Tcat<=t_min or Tcat<=t_pwm_period−t_max during the formation of the measurement window. Since the measurement time Tcat of one current is determined by the parameters of the measuring channel, the fulfilment of the previous condition is achieved by limiting the minimum duration of the PWM period−t_pwm_period. It is often necessary to reduce the pulse amplitude of the phase currents of the motor by reducing the duration of the PWM period below a certain limit. In this case, a method which measures currents every few periods can be used. In embodiments, currents are measured in a measurement period, followed by one or more periods without measurement. Measurement windows in the PWM period with currents measurement have required duration even if the applied voltage will differ from the reference voltage.

Conventional single-shunt current measurement techniques assume that the voltage distortion in the period with the measurement does not significantly affect the shape of the phase currents and can be compensated for by current regulators in the periods without measurement, where the generated by the converter phase voltages are equal to the reference voltage. This may create disadvantages. For example, the speed of current regulators determines the time of compensation for the effects caused by voltage distortion in the period with the measurement of currents. In addition, the distortion of the currents will continue at least until the formation of the voltage calculated after the next measurement of currents. Therefore, periodic disturbances caused by voltage distortion in the period with currents measurement are compensated by current regulators in the next 4-20 PWM periods, as shown in FIGS. 5A and 5B.

There have been attempts in conventional system to address the issue of insufficient duration of measuring windows at single-shunt current measurement. One known attempt to find a solution to this problem is to ignore current measurements during these critical periods. This is not desirable since FOC processing may require information from all three currents in order to estimate the position of the rotor. Another attempted solution estimates current measurements, which complicates the system and requires fine tuning since current increase now depends on past current measurement, motor parameters, and so on. A further attempted solution expands the period of time in which current measurement takes place. Without compensation this approach has disadvantages similar to those described above.

Figure 5A:
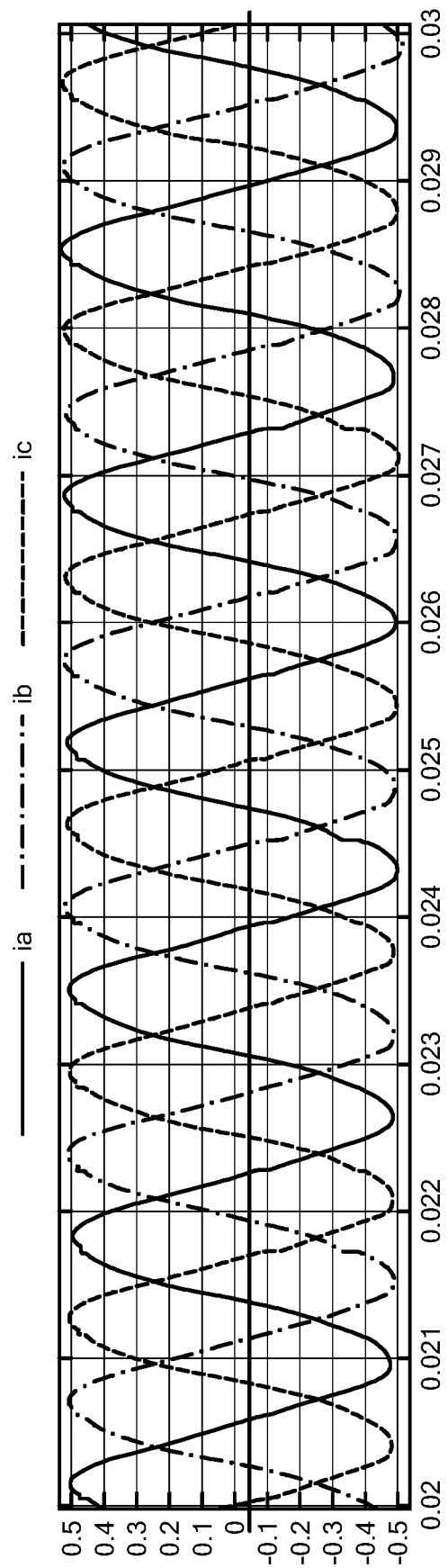
FIGS. 5A and 5B show the shape of average phase currents without compensation for measuring window adjustments.
Figure 5B:
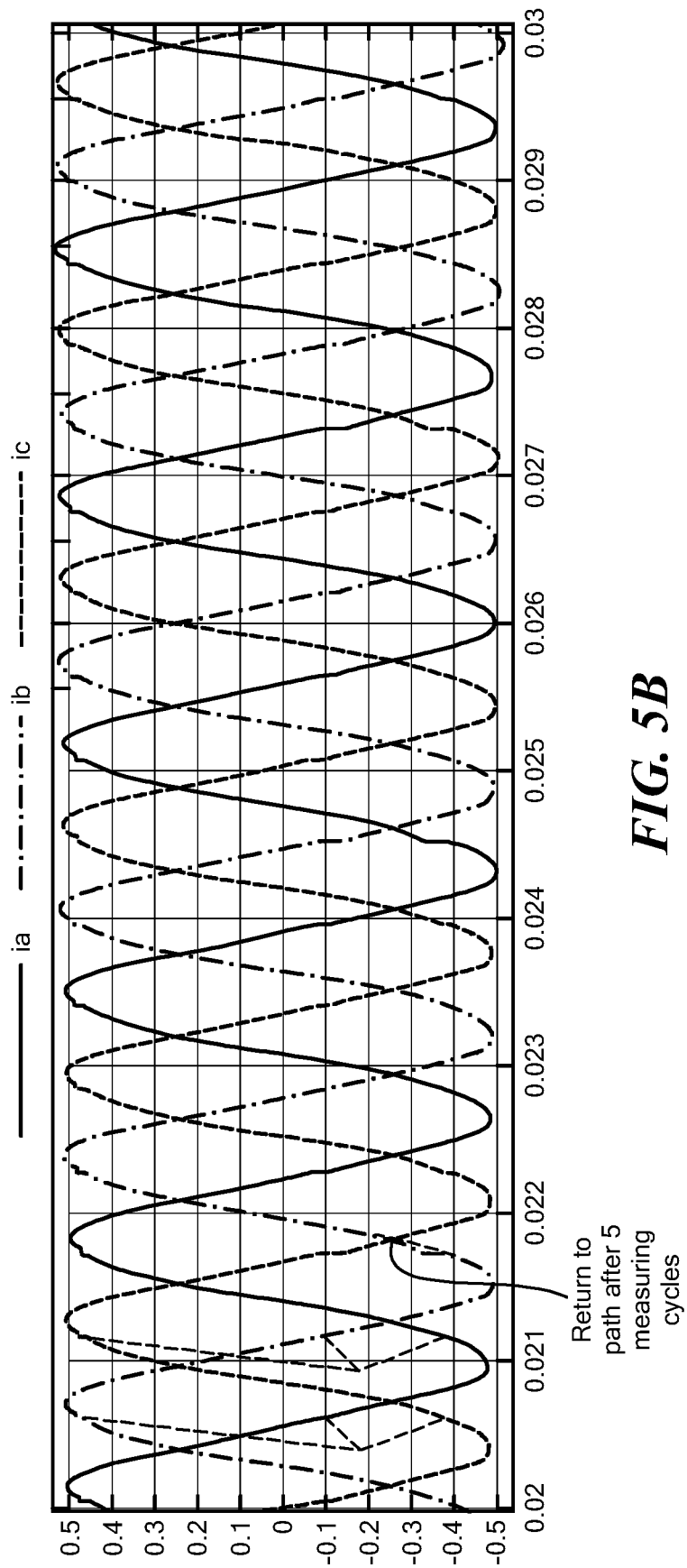
Figure 5C:
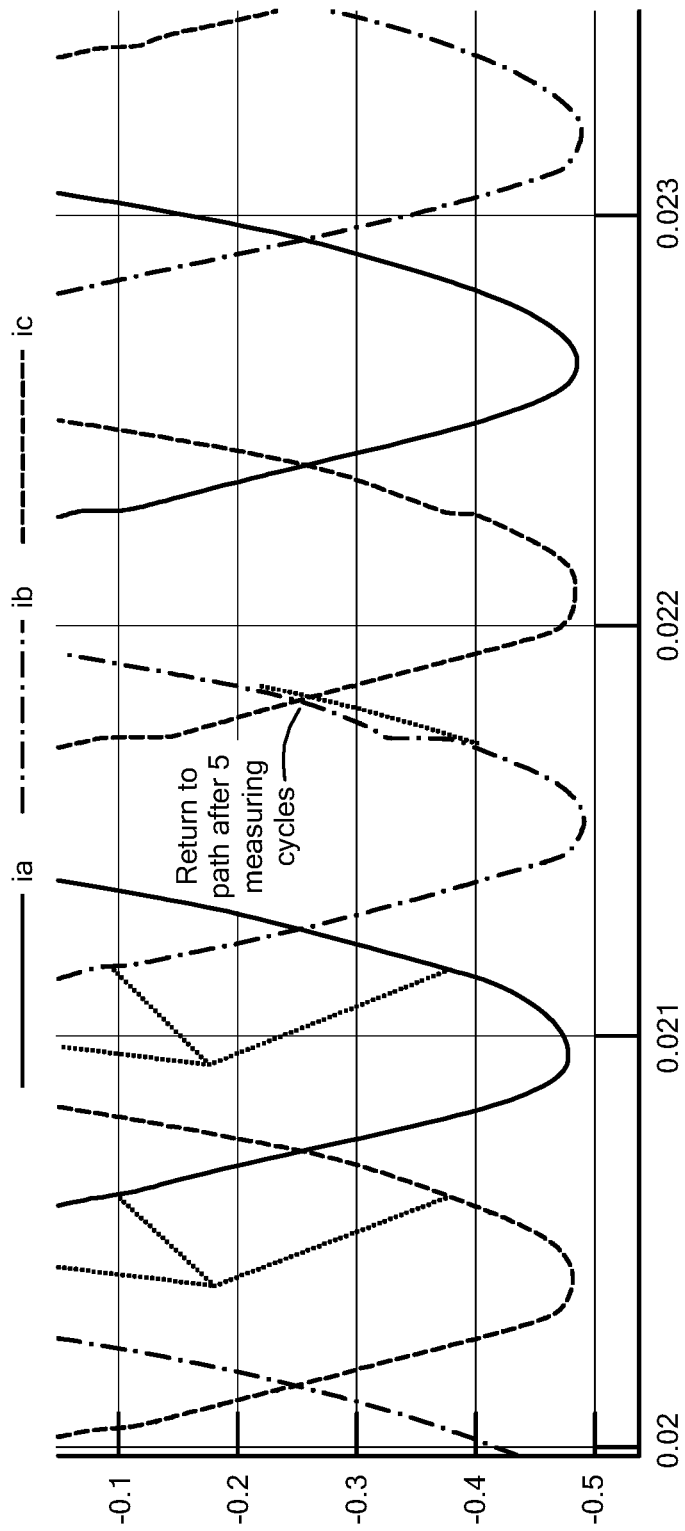
FIG. 5C shows voltage distortion in greater detail.

In FIGS. 5A and 5B, after voltage distortion, the current returns to the sine wave path after 5 measurement periods, that is, after 10 PWM periods if the currents are measured every second period, or 15—if the currents are measured every third . . . 20—if 4th. This result is achievable with the maximum speed of the current regulator, with a slower setting, the return will take longer. FIG. 5C shows voltage distortion in greater detail.

Figure 6:
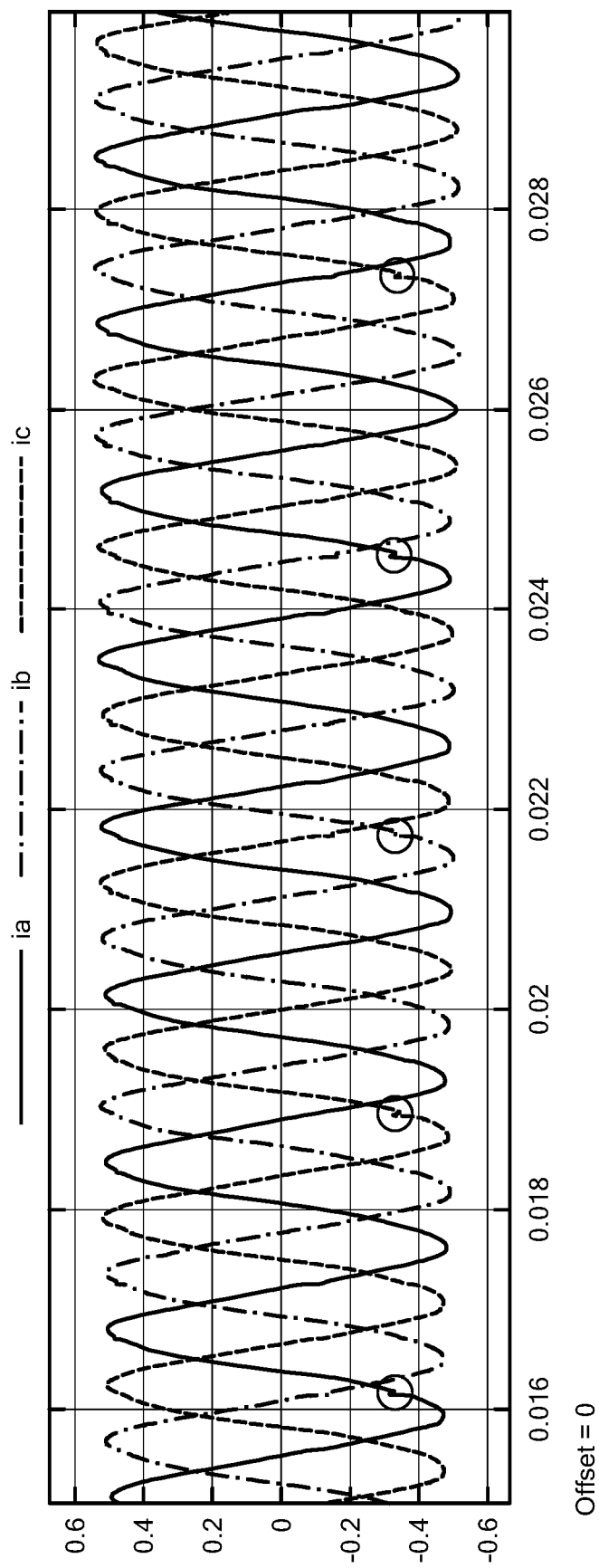
FIG. 6 shows phase currents after compensation for measuring window adjustments.

FIG. 6 shows current waveforms for example embodiments having compensation so that the current deviates from the path of the sinusoid for only one measurement period. In example embodiments of measurement compensation, such as those described below, voltage deviation caused by the unconditional formation of the measuring window is compensated for in the next or several subsequent PWM periods without the influence of current regulators. Therefore, the phase current deviates from the reference only for one, or possibly several, PWM periods which may be determined by the amount of compensation required.

Figure 7A:
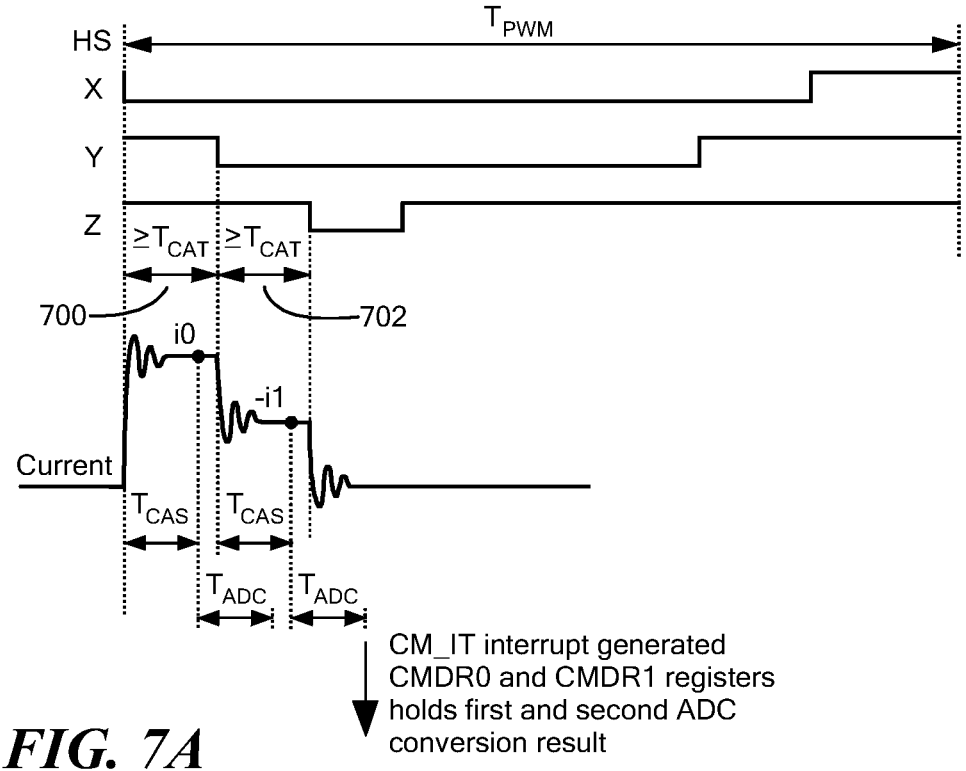
FIG. 7A shows an example edge start pulse width modulation switching scheme and FIG. 7B shows an example center aligned pulse width modulation switching scheme.
Figure 7B:
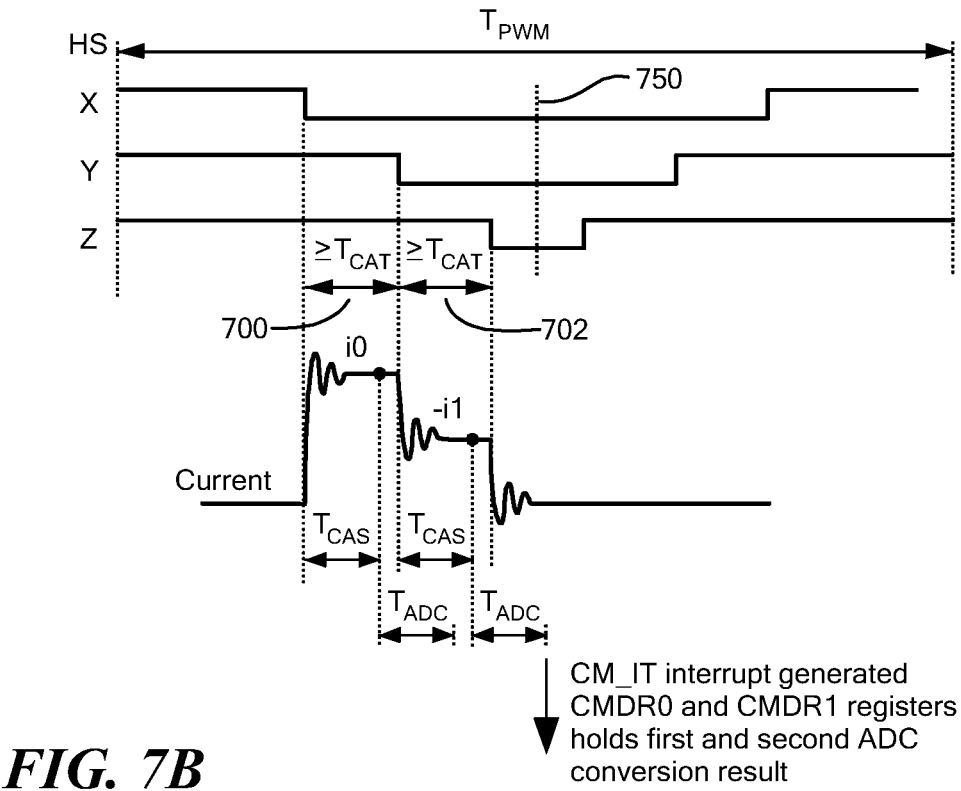

FIG. 7A shows an edge start PWM modulation scheme and FIG. 7B shows a center-aligned PWM modulation scheme. Current measurement is performed using a single shunt to obtain current in each of three motor phase windings by exploiting the fact that at certain states of the PWM switching pattern phase current flows thru shunt resistor, as described above. In a given PWM period, two of the three phase currents may be measured.

Figure 8:
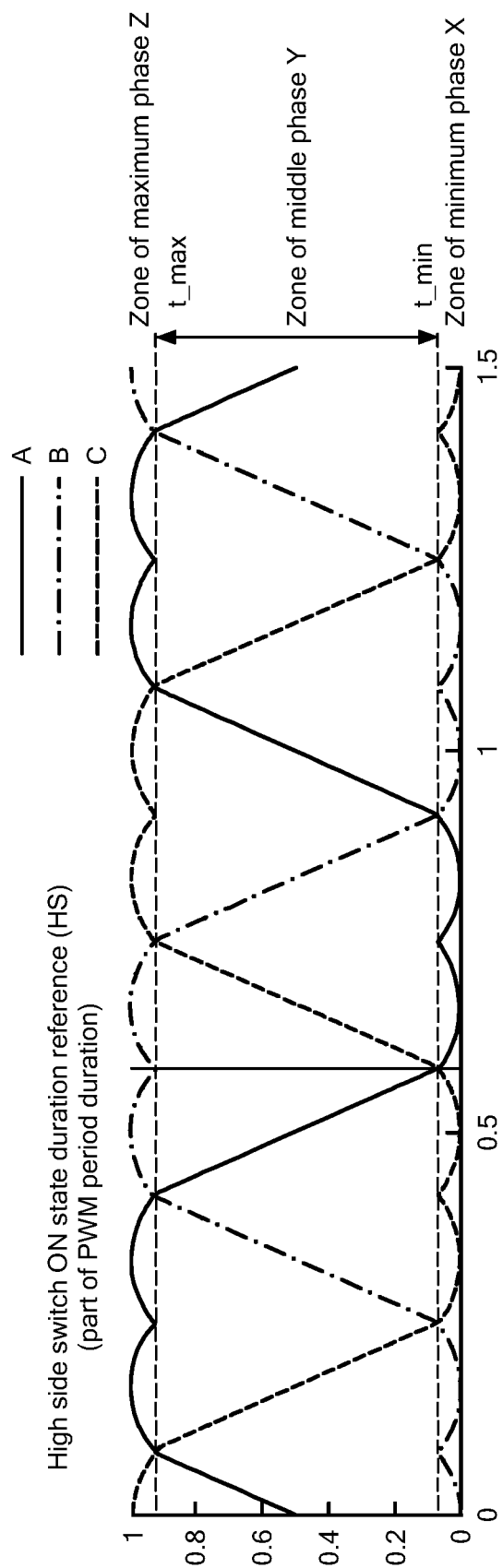
FIG. 8 shows high side motor switch ON state for maximum, middle and minimum phase.

In the edge start shown in FIG. 7A, states are shown for phases X, Y, and Z, which are defined in FIG. 8, indicating high side switch ON state durations in phases A, B, C to form a three-phase voltage on the motor windings. The high side (HS) switch ON state duration reference is shown for phase currents A, B, C. The zone of minimum phase X, the zone of middle phase Y, between minimum and maximum times t_min, t_max, and maximum phase Z are shown.

Current from only two of the three phases is obtained in one PWM period (or once over several PWM periods, depending on configuration). The third phase current can be computed based on Kirchhoff Current Law: ia+ib+ic=0. In embodiments, a control module can perform automatic current measurement with ADC conversion to acquire phase currents, store results in data registers, and generate interrupts (CM_IT) signaling that current acquisition has finished.

Referring again to FIG. 7A, a first current measurement window 700 is aligned with a falling edge of Y and a second current measurement window 702 is aligned with a falling edge of Z. The current Acquisition Settling time is shown as $T_{CAS}$ after which an ADC can digitize the current value. FIG. 7B shows similar measurement windows based on a center 750 of the PWM period.

Figure 9:
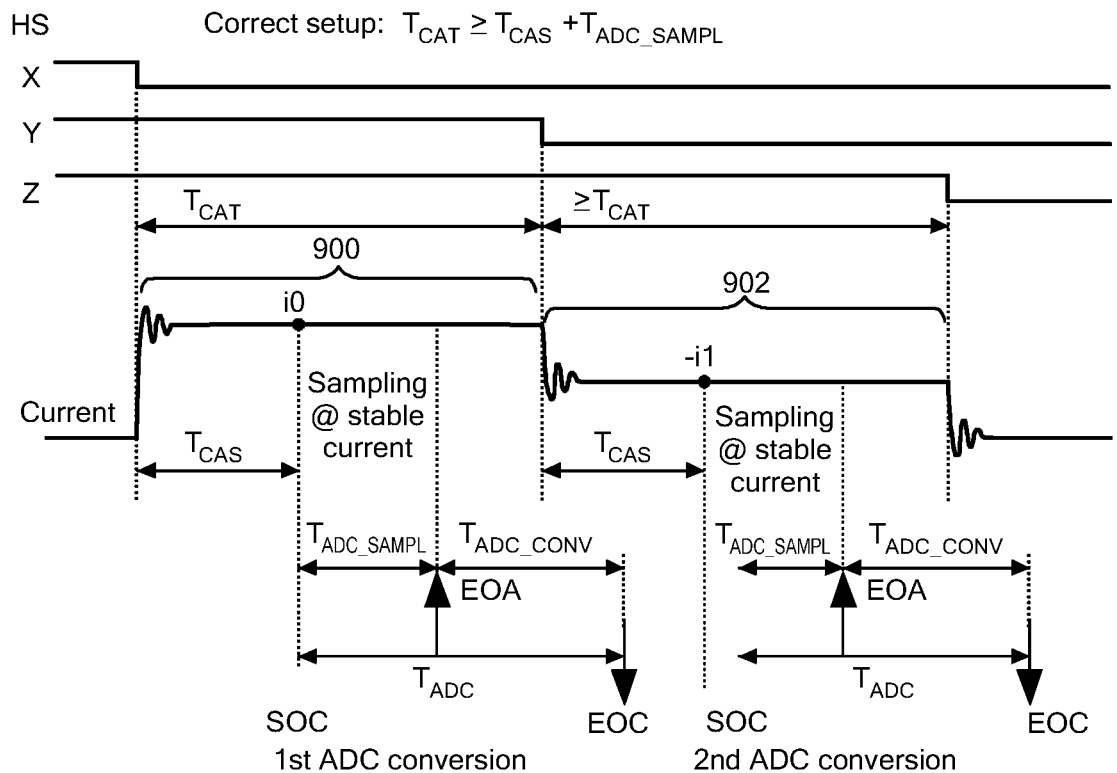
FIG. 9 shows a current measurement time constraint for proper current measurement and FIG. 9A shows a violation of a minimum current measurement time.
Figure 9A:
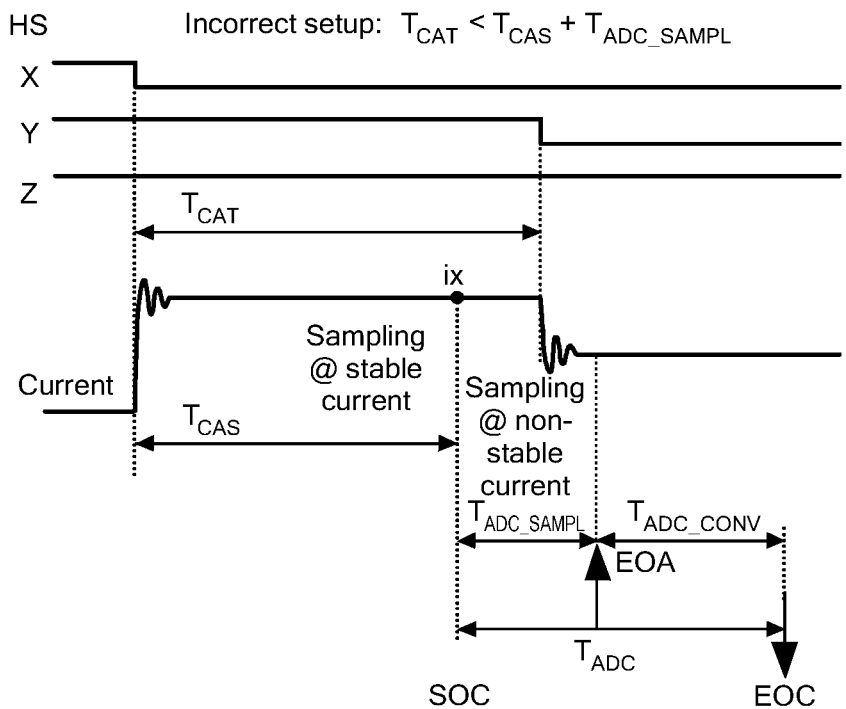

FIG. 9 shows additional detail for measurement window requirements. The minimum measurement window duration is Tcat. For the correct measurement of currents, the following condition must be satisfied:

$$Tcat > Tcas + Tadc\_sampl.$$

where
$T_{CAT}$—Current Acquisition Time—can be changed for each PWM period
$T_{CAS}$—Current Acquisition Settling Time,
$T_{ADC\_SAMPL}$—ADC Sampling Time
$T_{ADC\_CONV}$—ADC Conversion Time
$T_{ADC} = T_{ADC\_SAMPL} + T_{ADC\_CONV}$, total ADC time As can be seen, in the example embodiment, the first current measurement window 900 begins at the falling edge of X and ends at the falling edge of Y. After a time $T_{CAS}$ for current to settle, current is sampled during time $T_{ADC\_SAMPL}$ and digitized by an ADC during time $T_{ADC\_CONV}$ after which the value is available. A second current measurement window 902 begins at the end of the first window 900 and ends at a falling edge of Z. As can be seen, Tcat>Tcas+Tadc_sampl is met for the first and second current measurement windows 900, 902. FIG. 9A shows an incorrect setup where this requirement is not met.

When the duration of the PWM period decreases, minimum and maximum duration times of the ON state of the upper transistor in the phase with the middle value of the reference voltage, which is denoted as Y, is changed: the minimum time duration of the ON state of the upper transistor decreases, as indicated by the circles at the lower points in FIG. 8, and the maximum duration increases (upper circles in FIG. 8). The correct measurement of the two currents can only be guaranteed if a limit is imposed on HS in phase Y (HS_min>Tcat), and (HS_max<1−Tcat). If we limit the minimum HS duration in phase Y, then the Y phase voltage applied to the motor will differ from the reference voltage.

In FIG. 8, the circles at the t_min level show the moments where the minimum and middle phases change places, and the circles at the t_max level show the moments where the maximum and middle phases change places.

Figure 10:
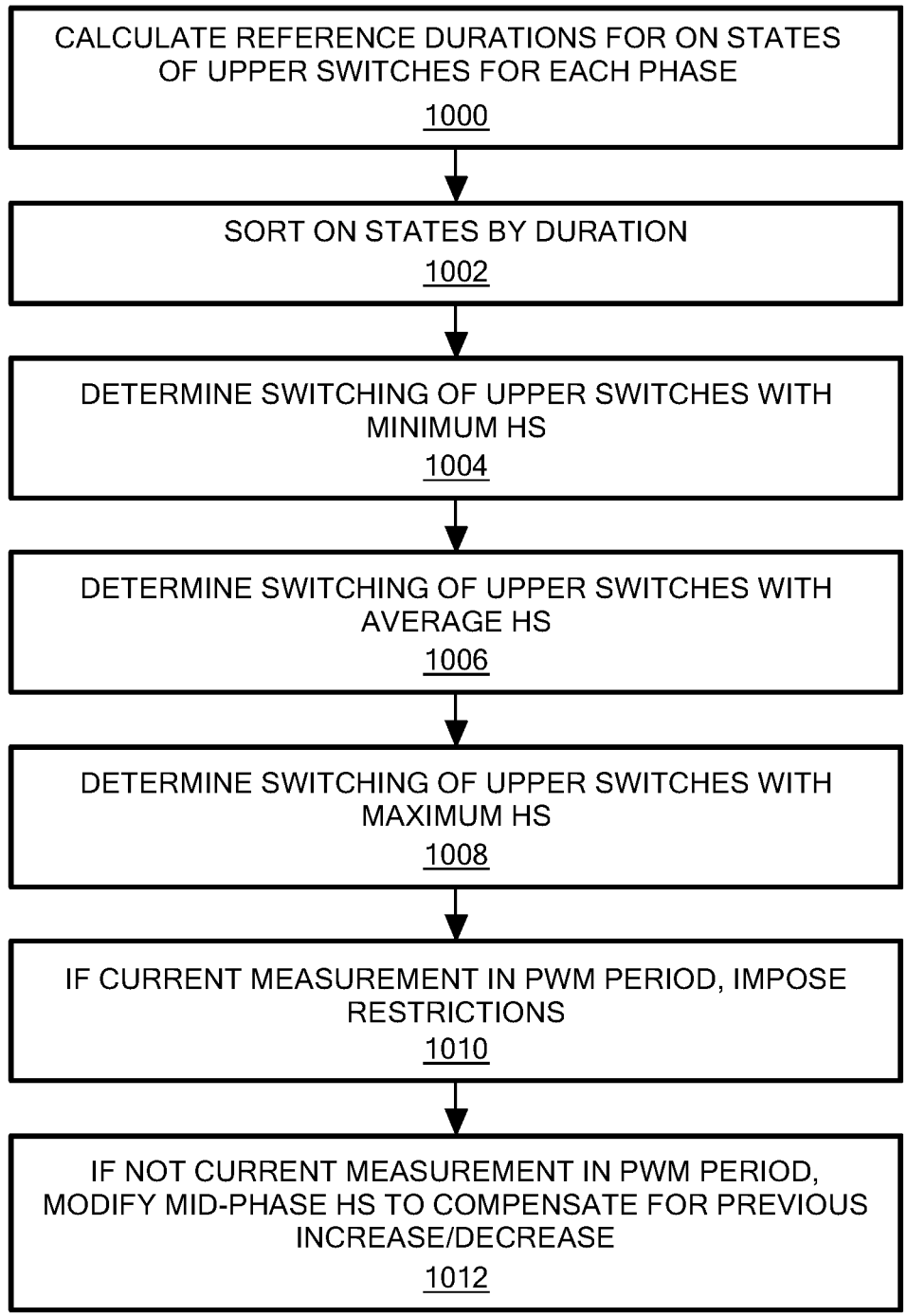
FIG. 10 shows an example sequence of steps for current measurement time adjustment compensation.

FIG. 10 shows an example sequence of steps for provide current measurement compensation in accordance with example embodiments of the disclosure. In step 1000, reference durations of the ON state of the upper switches of the converter for each phase (HSa, HSb, HSc) are calculated by the motor control algorithm. In step 1002, the reference durations of the ON state of the upper switches of the converter (HS) are sorted by duration. In step 1004, moments of switching of the upper switch in the phase with minimum HS is determined according to the principle of phase X. In step 1006, moments of switching of the upper switch in the phase with the average HS is determined according to the principle of phase Y. In step 1008, moments of switching of the upper switch in the phase with the maximum HS are determined according to the principle of phase Z, as shown in FIG. 8 for example. It is understood that steps 1000-1008 are conventional and well understood by one of ordinary skill in the art.

In step 1010, if currents will be measured in the current PWM period, restrictions are imposed to ensure the measurement of two currents using the formation of two measurement windows and to eliminate incorrect settings (see, e.g., FIG. 9A). In example embodiments, the middle phase HS is modified to provide windows for measuring currents. The difference in time between the reference HS and the modified HS (dt) may be stored for later compensation. In step 1012, if no currents will be measured in the current PWM period, the mid-phase HS is modified to compensate for the decrease or increase in the stored duration (dt) of the HS.

If there is more than one PWM period without current measurement, then the maximum possible part (dt) is compensated, and the remainder is stored in (dt) for compensation in the next period without measurement.

Figure 11:
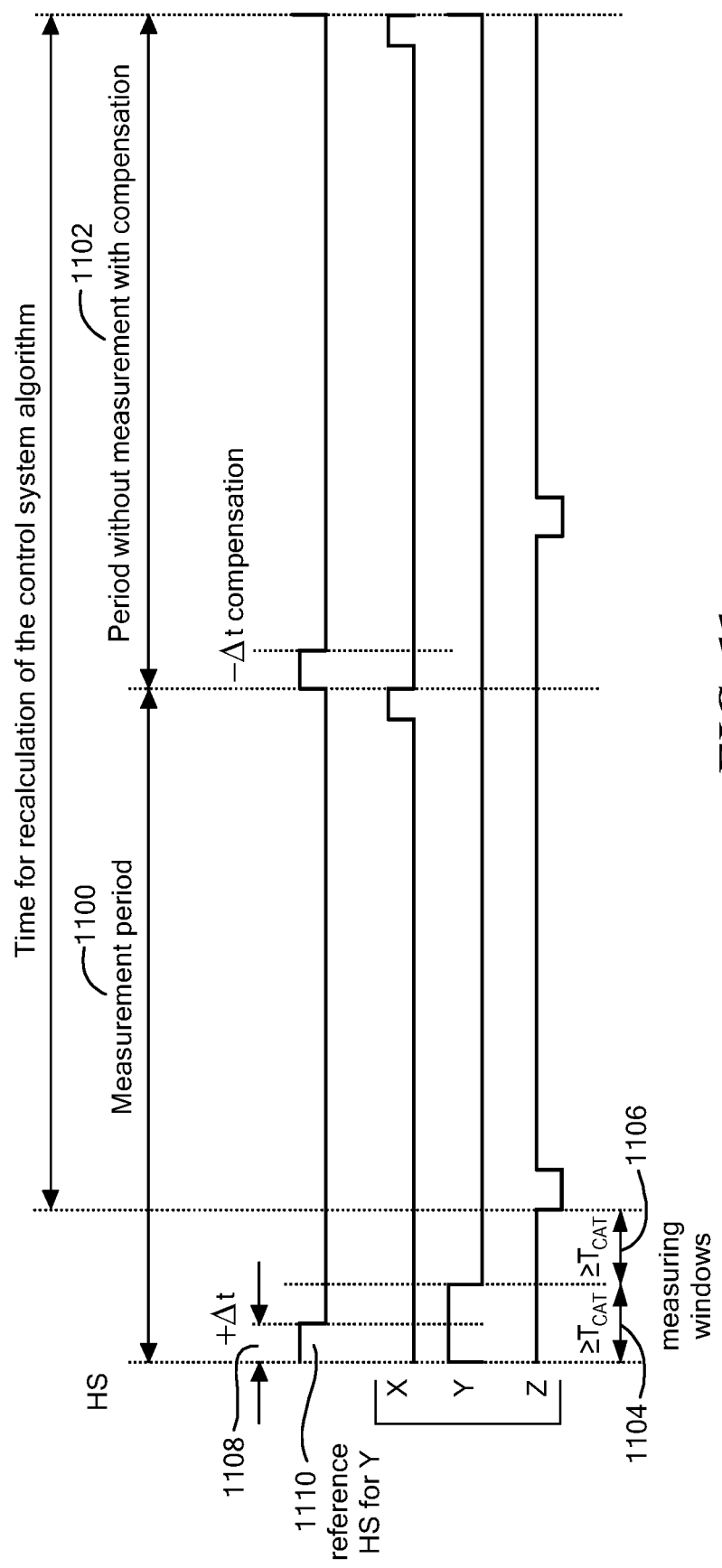
FIG. 11 is a timing diagram showing adjustment for a first current measurement window in a PWM period and current window adjustment compensation in a subsequent PWM period.

FIG. 11 shows an example of distortion compensation when t_min=Tcat/2. This an example of distortion compensation when the PWM period duration is reduced by so much that t_min becomes t_min=Tcat/2, which is two times less than the amount of time required to measure currents without distortion. To compensate for distortion at the ratio t_min=Tcat/2, one period without measurements is sufficient. As can be seen, in a period without measurement, the middle phase switch does not switch, which indicates that the compensation resource is fully used.

In the illustrated embodiment, there is a first PWM period 1100, which has current measurement, and a second PWM period 1102, which is without current measurement during which compensation can be performed for modifications made in the first PWM period. The first period 1100 has first and second current measurement windows 1104, 1106. In the illustrated embodiment, t_min 1108 is equal to Tcat 1104 divided by two. As can be seen, there is a reference HS for Y 1110 and HS for X, Y, and Z. In the first period 1100, the Y phase is extended by +Δt with respect to the reference Y 1110 so that the requirements for the current measurement are met (Tcat>Tcas+Tadc_sampl).

In the second period 1102, no current measurements are made and compensation is performed. At the beginning of the second PWM period 1102, the stored +Δt for Y is compensated for with a −Δt that cancels the reference Y signal 1110. That is, the −Δt in the second period 1102 cancels the +Δt from the first period 1100 so that middle phase Y does not transition in the second period.

Looking again to FIG. 8, this situation occurs at the points indicated by circles at the level of t_min. The worst case is shown when the minimum and average phases are equal. In general, the worst case does not occur every time the minimum and average phases are reversed. Taking into account the discretization of the measurement process in time, situations are possible when the measurement occurs before the moment of equality of the minimum and maximum phases, and after that. Then the distortion will be less and the required compensation will be less. With certain ratios of voltage frequency and measurement period durations, situations are possible when compensation is not required. The process of coincidence of measurement points and phase exchange points is random.

Figure 12:
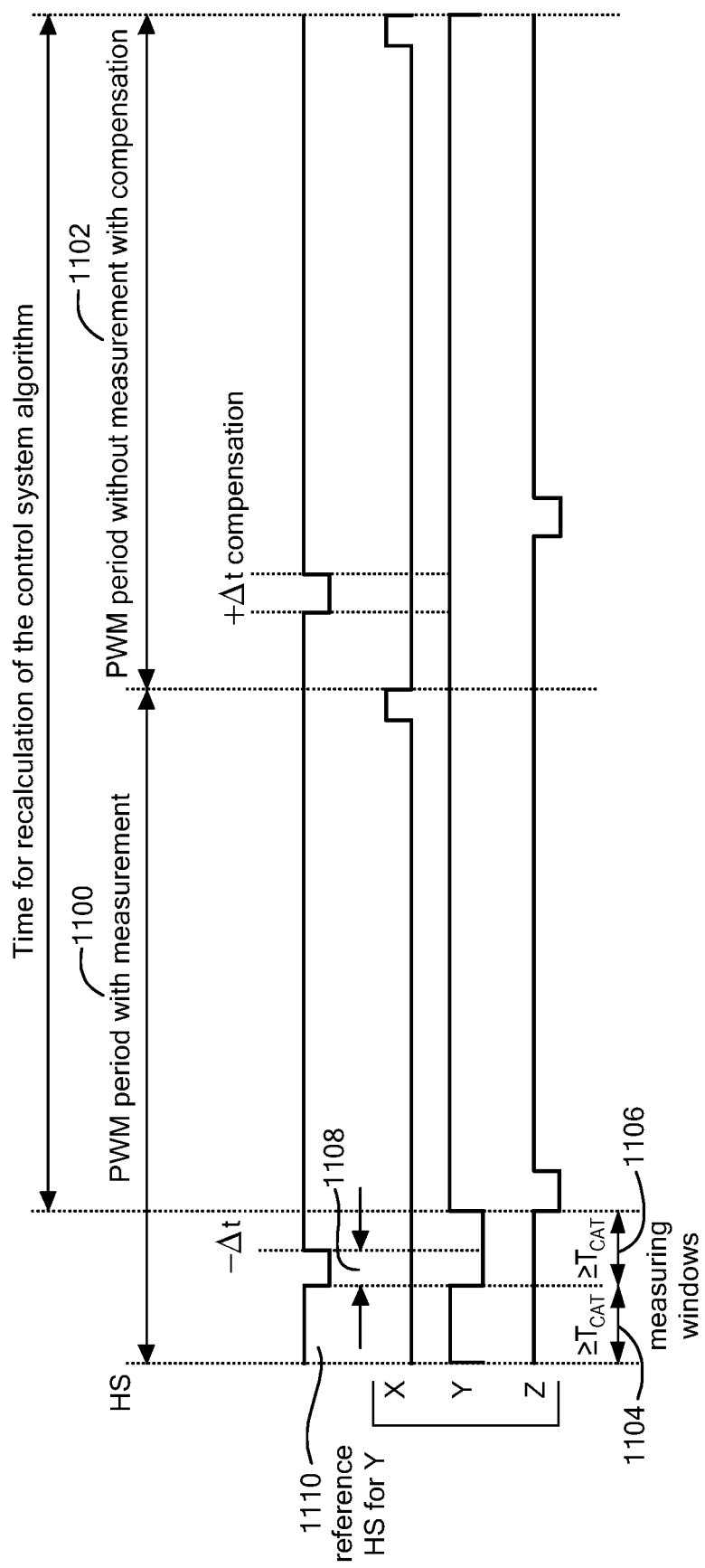
FIG. 12 is a timing diagram showing adjustment for a second current measurement window in a PWM period and current window adjustment compensation in a subsequent PWM period.
Figure 13:
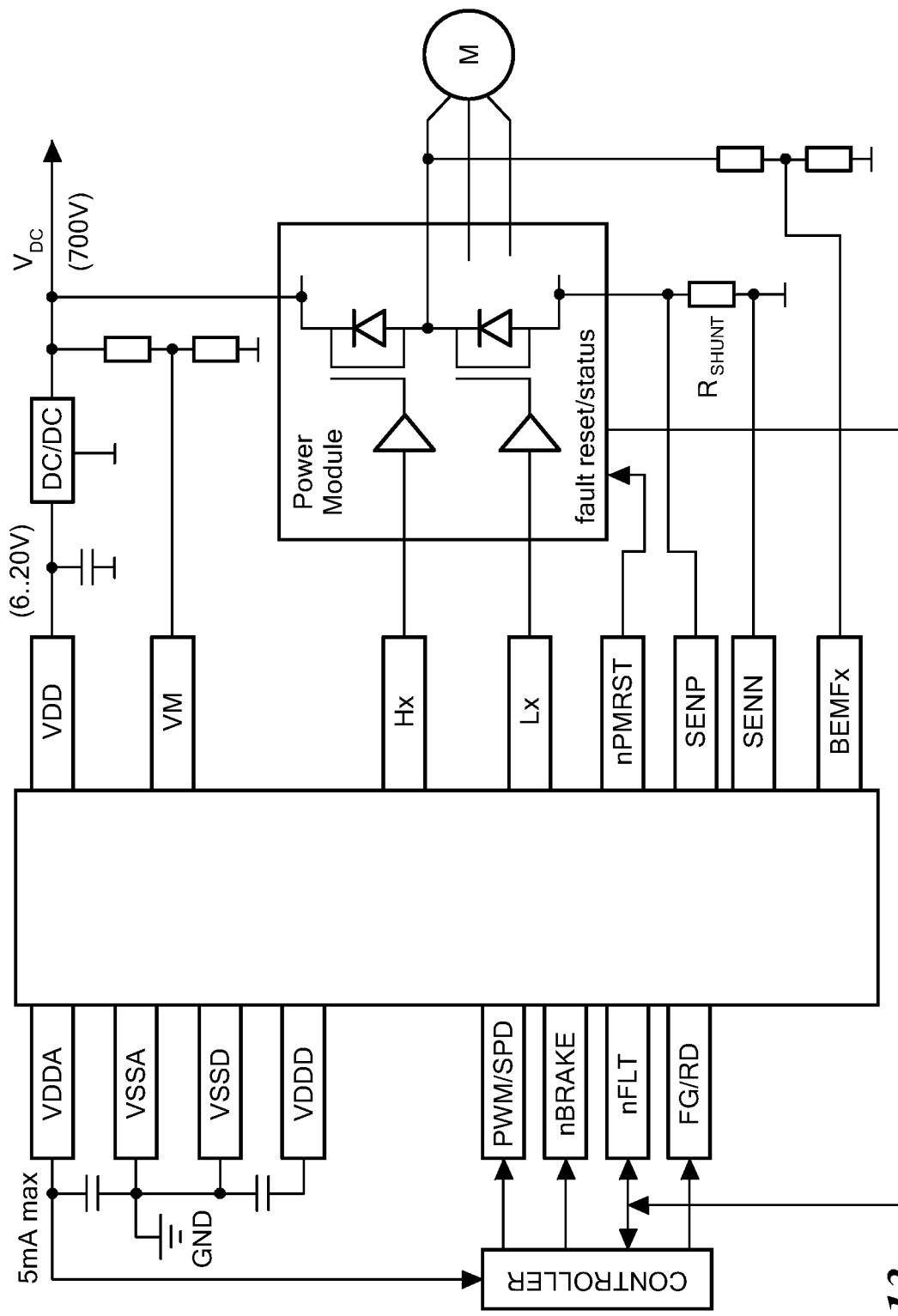
FIG. 13 shows an example IC package implementation of a motor controller having current measurement compensation.
Figure 14:
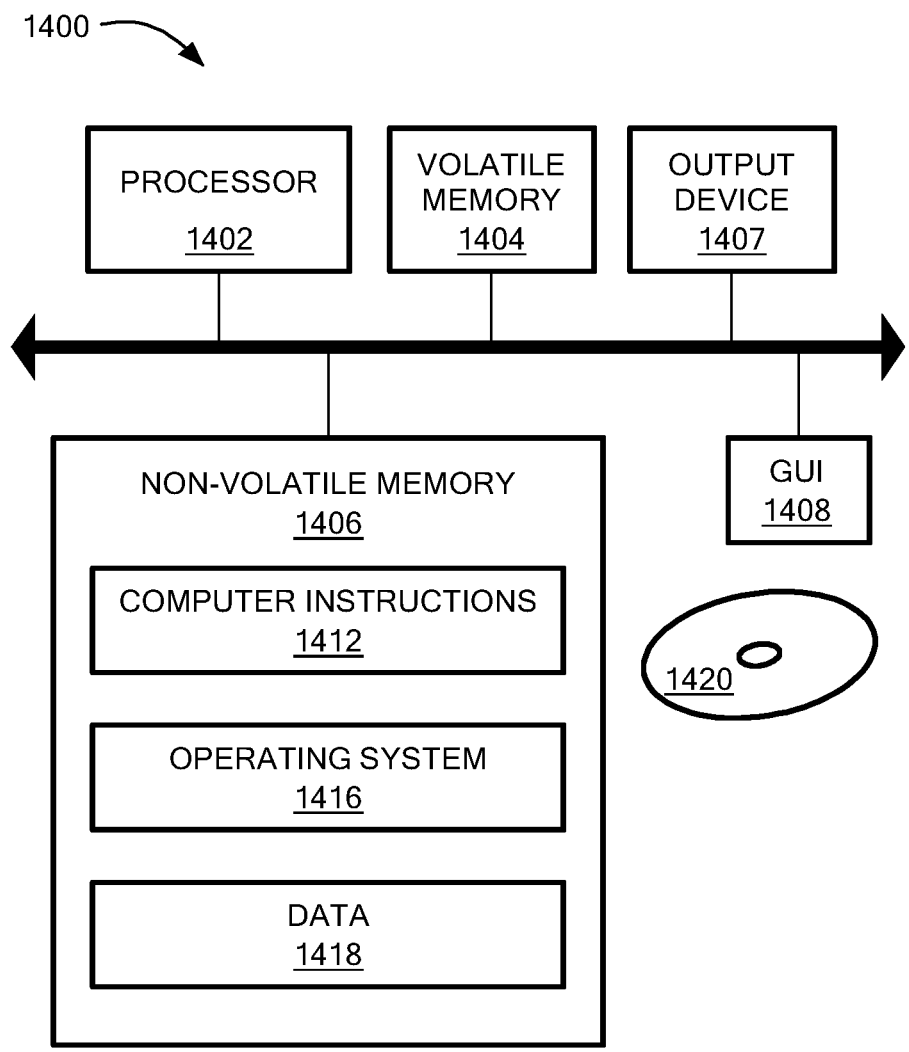
FIG. 14 is a schematic representation of an example computer that can perform at least a portion of the processing described herein.

FIG. 12 shows a switching pattern with compensation for a Tcat/2 decrease in the duration of the HS of middle phase Y in the measurement period. This situation occurs at the points indicated by circles at the level of t_max in FIG. 8. Similar to the t_min=Tcat/2 in FIG. 11, the middle phase Y is adjusted by −Δt in the first window 1100 and +Δt in the second window 1102.

Example motor controller systems include U.S. Pat. Nos. 9,843,285, 10,116,243, 10,181,810, 10,312,847, 10,326,389, 10,348,223, 10,873,280, and 10,784,810, all of which are incorporated herein by reference.

FIG. 10 shows an exemplary computer 1000 that can perform at least part of the processing described herein, such as generating current measurement compensation. The computer 1000 includes a processor 1002, a volatile memory 1004, a non-volatile memory 1006 (e.g., hard disk), an output device 1007 and a graphical user interface (GUI) 1008 (e.g., a mouse, a keyboard, a display, for example). The non-volatile memory 1006 stores computer instructions 1012, an operating system 1016 and data 1018. In one example, the computer instructions 1012 are executed by the processor 1002 out of volatile memory 1004. In one embodiment, an article 1020 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

As used herein, the term "magnetic field sensing element" is used to describe a variety of electronic elements that can sense a magnetic field. The magnetic field sensing element can be, but is not limited to, a Hall effect element, a magnetoresistance element, or a magnetotransistor. As is known, there are different types of Hall effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while metal based or metallic magnetoresistance elements (e.g., GMR, TMR, AMR) and vertical Hall elements tend to have axes of sensitivity parallel to a substrate.

As used herein, the term "magnetic field sensor" is used to describe a circuit that uses a magnetic field sensing element, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic field sensor is used in combination with a back-biased or other magnet, and a magnetic field sensor that senses a magnetic field density of a magnetic field.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method, comprising:
controlling, using a field-oriented control (FOC) system, a three-phase electric motor by:
determining a duration of current measurement windows within a first pulse width modulation period for measuring motor current using a single shunt coupled to the motor;
adjusting a duration of a first one of the current measurement windows by a time delta value to meet a minimum time to measure the motor current, wherein the minimum time to measure the motor current includes a sum of a current acquisition settling time (CAS) and an ADC sampling time.

2. The method according to claim 1, wherein the motor current is measured for only two of the three motor phases during the first pulse width modulation period.

3. The method according to claim 2, wherein the motor current measurement is not performed in compensation periods for the adjusted duration of the first one of the current measurement windows.

4. The method according to claim 2, further including adjusting a second one of the pulse width modulation periods by the time delta value to compensate for adjusting the duration of the first one of the current measurement windows in the first one of the pulse width modulation periods, wherein the second one of the pulse width modulation periods occurs after the first one of the pulse width modulation periods.

5. The method according to claim 1, wherein controlling a three-phase electric motor includes controlling driver switches for driving the motor phase including controlling a high side (HS) switch ON state duration having a zone of maximum phase Z, a zone of middle phase Y, and a zone of minimum phase X.

6. The method according to claim 5, wherein the zone of maximum phase Z is above a maximum time t_max, and the zone of minimum phase X is below a minimum time t_min, and the zone of middle phase Y is between the minimum time t_min and the maximum time t_max.

7. The method according to claim 6, further including changing minimum and maximum duration times of the ON state of the upper transistor in the middle phase Y when a duration of a given PWM period changes.

8. The method according to claim 7, further including modifying a duration of the middle phase Y from a reference Y signal to adjust the duration of the first one of the current measurement windows by the time delta value to meet the minimum time to measure the motor current.

9. The method according to claim 8, further including modifying a duration of the middle phase Y from a reference Y signal by the time delta value in a second one of the pulse width modulation periods to compensate for adjusting the duration of the first one of the current measurement windows in the first one of the pulse width modulation periods, wherein the second one of the pulse width modulation periods occurs after the first one of the pulse width modulation periods.

10. The method according to claim 9, wherein the middle phase Y does not transition during the second one of the pulse width modulation periods.

11. The method according to claim 4, wherein the FOC system includes i and q current regulators, and wherein the i and q current regulators do not influence the adjustment of the second one of the pulse width modulation periods.

12. A system, comprising:
a field oriented control (FOC) motor controller having circuity configured to control a three-phase electric motor by:
determining a duration of current measurement windows within a first pulse width modulation period for measuring motor current using a single shunt coupled to the motor;
adjusting a duration of a first one of the current measurement windows by a time delta value to meet a minimum time to measure the motor current, wherein the minimum time to measure the motor current includes a sum of a current acquisition settling time (CAS) and an ADC sampling time.

13. The system according to claim 12, wherein the motor current is measured for only two of the three motor phases during the first pulse width modulation period.

14. The system according to claim 13, wherein the motor current measurement is not performed in compensation periods for the adjusted duration of the first one of the current measurement windows.

15. The system according to claim 13, wherein the motor controller is further configured to adjust a second one of the pulse width modulation periods by the time delta value to compensate for adjusting the duration of the first one of the current measurement windows in the first one of the pulse width modulation periods, wherein the second one of the pulse width modulation periods occurs after the first one of the pulse width modulation periods.

16. The system according to claim 12, wherein controlling the three-phase electric motor includes controlling driver switches for driving the motor phase including controlling a high side (HS) switch ON state duration having a zone of maximum phase Z, a zone of middle phase Y, and a zone of minimum phase X.

17. The system according to claim 16, wherein the zone of maximum phase Z is above a maximum time t_max, and the zone of minimum phase X is below a minimum time t_min, and the zone of middle phase Y is between the minimum time t_min and the maximum time t_max.

18. The system according to claim 17, wherein the motor controller is further configured to change minimum and maximum duration times of the ON state of the upper transistor in the middle phase Y when a duration of a given PWM period changes.

19. The system according to claim 18, wherein the motor controller is further configured to modify a duration of the middle phase Y from a reference Y signal to adjust the duration of the first one of the current measurement windows by the time delta value to meet the minimum time to measure the motor current.

20. The system according to claim 19, wherein the motor controller is further configured to modify a duration of the middle phase Y from a reference Y signal by the time delta value in a second one of the pulse width modulation periods to compensate for adjusting the duration of the first one of the current measurement windows in the first one of the pulse width modulation periods, wherein the second one of the pulse width modulation periods occurs after the first one of the pulse width modulation periods.

21. The system according to claim 20, wherein the middle phase Y does not transition during the second one of the pulse width modulation periods.

22. The system according to claim 15, wherein the FOC system includes i and q current regulators, and wherein the i and q current regulators do not influence the adjustment of the second one of the pulse width modulation periods.

* * * * *